United States Patent [19]

Sugimura et al.

[11] Patent Number: 4,873,917
[45] Date of Patent: Oct. 17, 1989

[54] APPARATUS FOR CONTINUOUSLY COOKING RICE BY STEAMING

[75] Inventors: Tuyoshi Sugimura, Tokyo; Kenji Hori; Kiyoyuki Oba, both of Kobe, all of Japan

[73] Assignees: Iseki Food Engineering Kabushiki Kaisha, Tokyo; Kabushiki Kaisha Horiken, Hyogo, both of Japan

[21] Appl. No.: 259,195

[22] Filed: Oct. 18, 1988

[30] Foreign Application Priority Data

Oct. 19, 1987 [JP] Japan ................... 62-263533

[51] Int. Cl.$^4$ ........................................... A47J 37/12
[52] U.S. Cl. .................................... 99/355; 99/404; 99/443 C; 99/477; 99/494; 426/510; 426/511
[58] Field of Search ............... 99/348, 352, 355, 356, 99/404, 407, 403, 405, 406, 443 C, 477, 483, 494, 516, 534, 536

[56] References Cited

U.S. PATENT DOCUMENTS

| | | | |
|---|---|---|---|
| 3,561,347 | 2/1971 | Ellis | 99/352 |
| 3,824,917 | 7/1974 | Kawahara et al. | 99/404 |
| 3,910,175 | 10/1975 | Smith | 99/477 |
| 4,338,344 | 7/1982 | Brooks et al. | 99/355 |
| 4,387,630 | 6/1983 | Timbers et al. | 99/516 X |
| 4,561,347 | 12/1985 | Zaitu | 99/404 |
| 4,571,341 | 2/1986 | Sugimura | 426/510 |

Primary Examiner—Timothy F. Simone
Attorney, Agent, or Firm—Browdy and Neimark

[57] ABSTRACT

The apparatus comprises a primary steaming unit for exposing rice being conveyed on a first conveyor to steam, a water tank for immersing rice discharged from the first conveyor in hot water, a second conveyor for conveying rice discharged from the water tank, and a secondary steaming unit for exposing rice being conveyed on the second conveyor to steam.

Above an inlet end of the second conveyor, a space is formed, which is free from intrusion of steam from the secondary steaming unit. A seasoning liquid feeder is disposed in the space for supplying a season liquid such as salt, shoyu, sake, vinegar to rice. An ingredient feeder for supplying vegetables, meat, fish and so on to rice is disposed in or near the space.

5 Claims, 3 Drawing Sheets

APPARATUS FOR CONTINUOUSLY COOKING RICE BY STEAMING

BACKGROUND OF THE INVENTION

This invention relates to an apparatus for continuously cooking a large amount of grain, particularly rice, by steaming.

U.S. Pat. No. 4,561,347 discloses an apparatus for continuously cooking rice by steaming, which comprises a primary steaming unit for exposing rice on a belt conveyor to steaming, a immersing unit for immersing the rice discharged from the primary steaming unit in hot water and a secondary steaming unit for exposing the rice discharged from the immersing unit to steam again.

SUMMARY OF THE INVENTION

The present invention has an object of improving the disclosed apparatus noted above and provide an apparatus for continuously cooking rice by steaming, in which a seasoning liquid containing salt, shoyu, sake, vinegar, edible oil, etc. and such ingredients as vegetables, meat, fish, etc. are added to rice being steamed to obtain seasoned steamed rice with ingredients.

DETAILED DESCRIPTION OF THE PREFERRED EMBODIMENT

Figure 1:
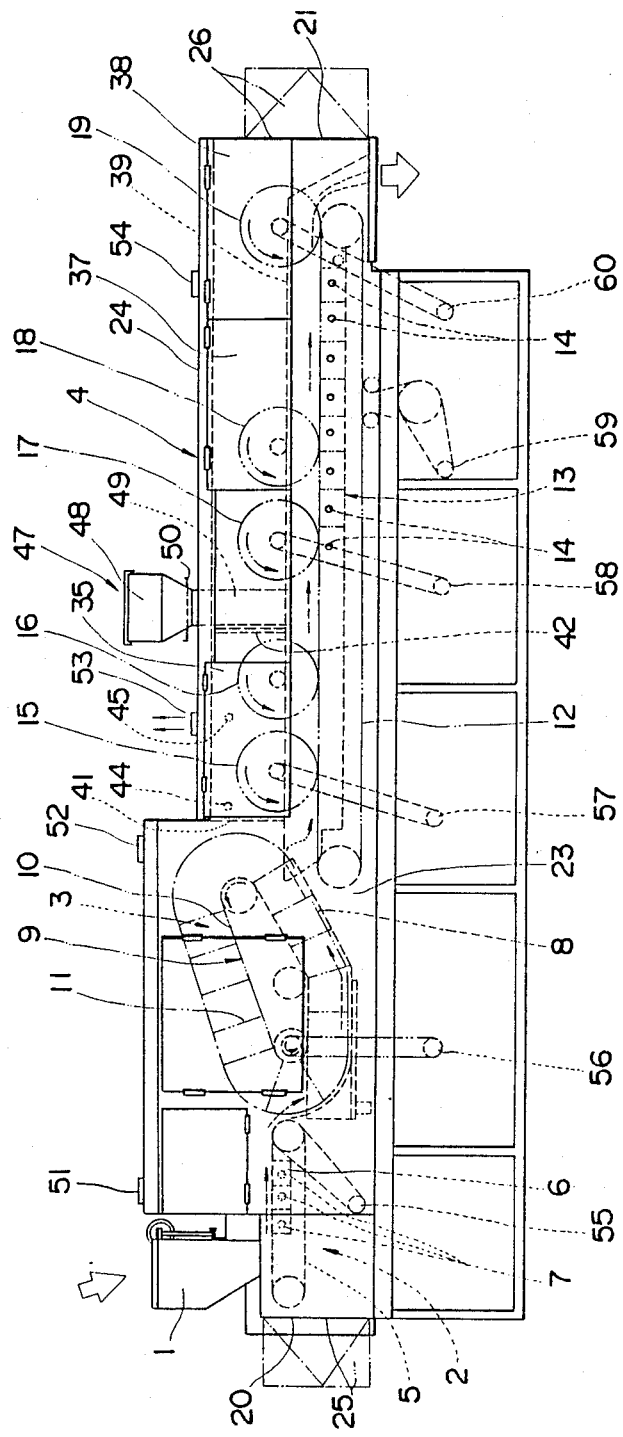
FIG. 1 is a side view showing an embodiment of the invention.
Figure 2:
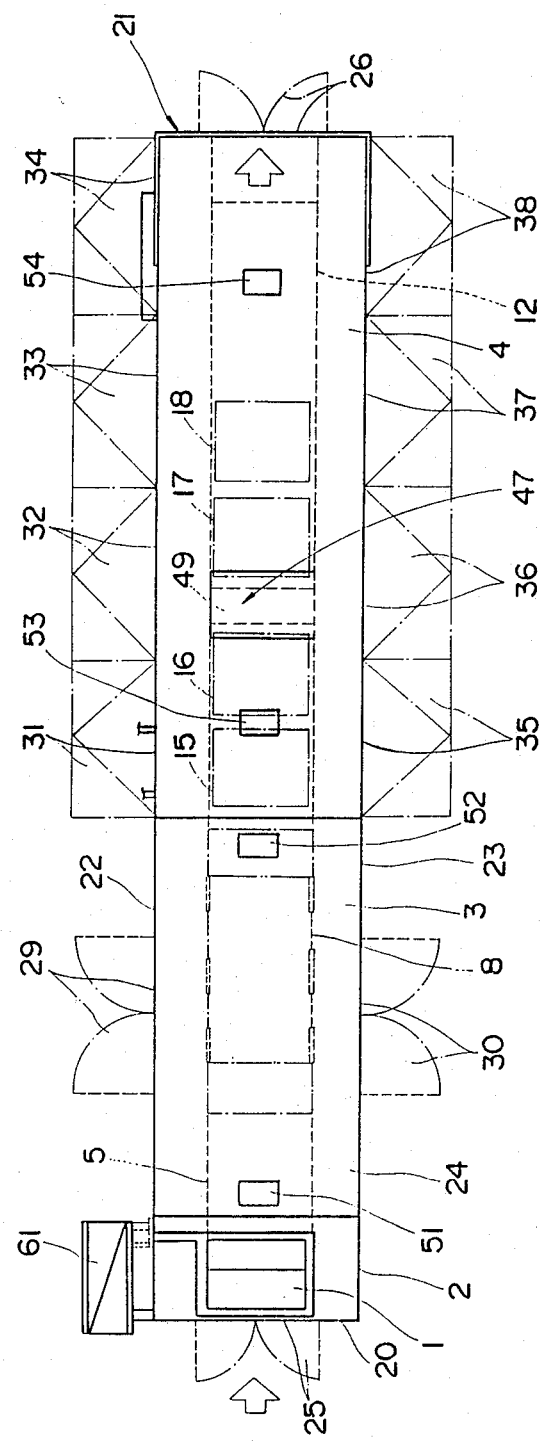
FIG. 2 is plan view showing the same.
Figure 3:
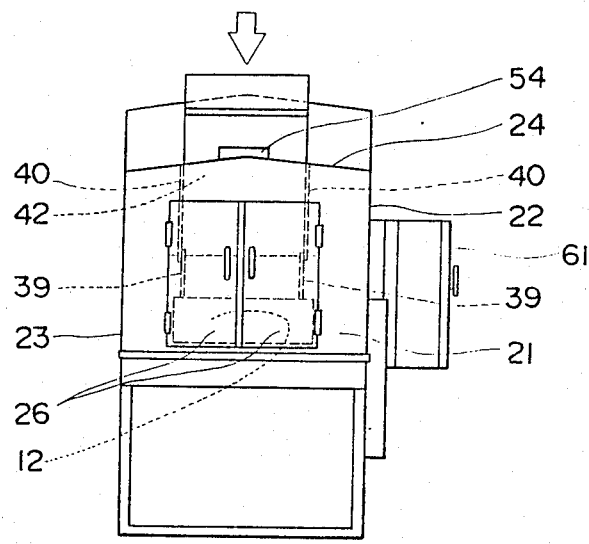
FIG. 3 is a back view of the same.
Figure 4:
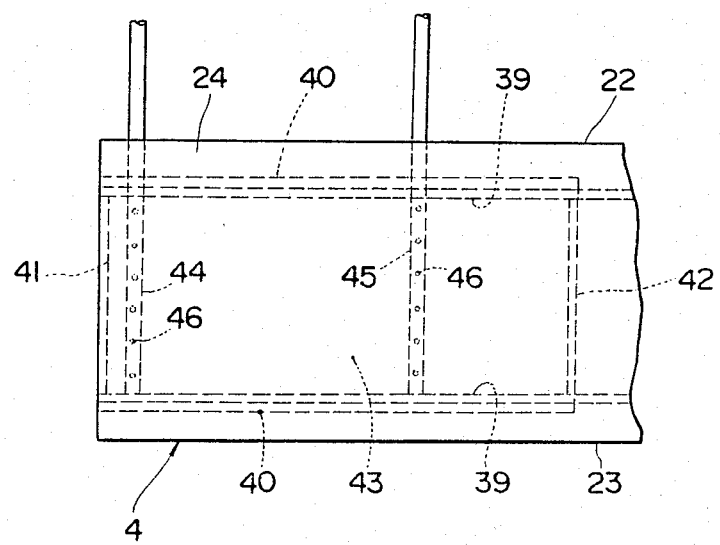
FIG. 4 is a plan view showing a seasoning liquid feeder.

An embodiment of the invention will now be described with reference to the accompanying drawing. Referring to the Figures, there is showing a cooking apparatus comprises a tank 1 which can contain a predetermind quantity of material grain (which is assumed to be rice in this embodiment), a primary steaming unit 2, for supplying steam to rice which was immersed in water and alphatizing starch, an immersing unit 3 for immersing the rice discharged from the tank 1 in hot water and making the rice softer by replenishing with necessar water content, and a secondary steaming unit 4 for supplying finishing steam to the rice discharged from the immersing unit 3.

An immersion tank (not shown) is provided near the tank 1, and rice is immersed in water in the immersion tank for a predetermind period of the time. The immersion tank and tank 1 are connected to each other by a transfer unit (not shown).

The primary steaming unit 2, noted above, is provided beneath the tank 1. The unit 2 includes a net type endless belt conveyor 5 having innumerable steam passage holes smaller in diameter than the rice grain, and rice in the tank 1 is allowed to fall onto the belt conveyor 5. Between the upper and lower runs of the belt of the belt conveyor 5, a plurality of steam chambers 6 are provided in a row extending in the conveying direction. In each steam chamber 6, a team discharge tube 7 with innumerable steam passage holes is provided. The individual steam discharge tubes 7 are connected to a separately provided steam source (not shown). Steam discharged from the tubes 7 is suitably at a temperature of about 100° C. Steam supplied from the steam discharge tubes 7 rises through the steam passage holes of the belt conveyor 5 to steam the rice on the belt conveyor 5 and alphatize the rice starch.

The immersing unit 3, noted above, is connected to the outlet of the primary steaming unit 2. The immersing unit 3 includes a water tank 8 for immersing the rice discharged from the belt conveyor 5 in hot water at a temperature of about 85° C. In the water tank 8 is disposed a transfer unit 9, which includes a movable endless belt 10 and a plurality of rectangular material push-on plates 11 of stainless steel provided on the endless belt 10 at a predetermined interval. Hot water is supplied to the water tank 8 from a hot water feeder (not shown).

The rice from the immersing unit 3 is supplied to the secondary steaming unit 4. The secondary steaming unit 4, like the primary steaming unit 2, includes a net type endless belt conveyor 12 with steam passage holes incapable of being penetrated by rice grains and a plurality of steam chambers 13 provided between the upper and lower runs of the belt. The steam chambers 13 are provided along the rear half of the belt conveyor 12 in the conveying direction for a reason to be described later. A steam discharge tube 14 with innmerable steam passage holes 14 is provided in each steam chamber 13, and the individual steam discharge tubes 14 are connected to a separately provided steam source (not shown). The steam discharged from the tubes 14 is suitably at a temperature slightly higher than that in the primary steaming unit 2, typically 110° C. 130° C. Steam supplied from the steam discharge tubes 14 rises through the steam passage holes of the net type conveyor 12 to steam the rice on the belt conveyor 12, thus giving the rice grain surface a gloss and viscosity.

Along the top of the belt conveyor 12, there are provided a plurality of stirrers 15 to 19 which also serve as feeders. These stirrers are rotated in the counter-clockwise direction in FIG. 1 to feed the rice on the belt conveyor 12. They each include a shaft extending perpendicular to the conveying direction and a plurality of radially spaced-apart bars each embedded in the shaft and having an L-shaped free end. They are rotated such that the ends of the bars are moved faster than the belt conveyor 12. The L-shaped bar ends thus stir the rice on the belt conveyor surface such as to push out the rice.

The primary steaming unit 2, immersing unit 3 and secondary steaming unit 4 are surrounded by front and rear end walls 20 and 21, left and right side walls 23 and 22 and a stop wall 24. The front and rear end walls 20 and 21 are provided with respective doors 25 and 26. The right side wall 22 is provided with doors 29 for the immersing unit 3, and the left side wall 23 is provided with doors 30 for the immersing unit 3 and doors 35 to 38 for the secondary steaming unit 4.

Above the belt conveyor 12 of the secondary steaming unit 4, there are provided a pair of substantially vertical guide plates 39 spaced apart a distance slightly smaller than the width of the belt. The guide plates 39 are secured by suitable means to the left and right side walls or the top wall. Between the lower edge of each guide plate 39 and belt conveyor 12 a gap is formed, through which rice can not leak. The guide plates 39 cover the entire length of the belt conveyor 12.

A pair of enclosure plates 40 extend upwardly from the respective guide plates 39. These enclosure plates 40 extend from a position corresponding to the front inlet of the stirrer to a position behind the stirrer 16. The upper edge of each enclosure plate 40 is removably secured to the top wall 24. Lateral regulator plates 41 and 42 are in contact with the respective front and rear edges of the enclosure plates 40. The regulator plates 41 and 42 have their upper edge removably coupled to the top wall 24. They extend downwards to the position corresponding to the upper edge of the guide plates 39. The upper half of each of the stirrers 15 and 16, therefore, is found in a space 43 defined by the enclosure plates 40, regulator plates 41 and 42 and top wall 24.

In the space 43, there are provided seasoning liquid supply tubes 44 and 45 of a seasoning liquid feeder for spraying a seasoning liquid, which is prepared by suitably mixing together salt, shoyu, sake, vinegar, edible oil, etc. against rice being stirred by the stirrers 15 and 16. The supply tubes 44 and 45 extend obliquely above the front inlets of the respective stirrers 15 and 16. The seasoning liquid sprayed from supply ports 46 of the supply tubes 44 are immediately mixed with rice by the stirrer 15, and the seasoning liquid supplied from supply ports 46 of the supply tube 45 is immediately mixed with rice by the stirrer 16.

As noted before, the steam chambers 13 are provided along the rear half of the net type belt conveyor 12. This is done so for avoiding intrusion of steam into the space 43 from the steam chambers 13. If steam enters the space 43, the seasoning liquid sprayed from the seasoning liquid supply tube 44 is heated by the steam, and its moisture content is evaporated, resulting in attachment of salt, shoyu, sake, vinegar, edible oil, etc. to the seasoning liquid supply tube 44 in a short period of time and giving rise to the clogging of the supply ports 46. Behind the space 43, an ingredient feeder 47 is provided for supplying finely sliced vegetables, meats, fish and other ingredients to rice on the belt conveyor 12. The ingredient feeder 47 includes an ingredient tank 48, an ingredient guide 49 provided at the lower end of the ingredient tank 48 and a shutter 50. The ingredient guide 49 has an outlet facing a laterally central portion of the belt conveyor 12. The ingredient feeder 47, like the seasoning liquid supply tubes, is desirably provided at a position free from the access of steam from the steam chambers 13 for the ingredients will be dried and deteriorated if heated by steam. Therefore, the ingredient feeder 47 may be provided in the space 43, or the space 43 may be rearwardly shifted in position so that the ingredient feeder 47 is found ahead of the space 43.

The top wall 24 is provided with exhausting members 51 to 54 respectively of the primary steaming unit 2, immersing unit 3, space 43 and secondary steaming unit 4. Each exhausting member is connected to an exhausting fan (not shown). Reference numeral 55 designates a motor for the belt conveyor 5; 56, a motor for the belt 10; 57, a motor for the stirrers 15 and 16; 58, a motor for the stirrers 17 and 18; 59, a motor for the belt conveyor 12; 60, a motor for the stirrer 19; and 61, an operating unit.

OPERATION

In the use of this apparatus, rice which was immersed in water for a predetermined period of time is stored in the tank 1, and then the shutter is opened. As a result, the rice is allowed to fall onto the belt conveyor 5 to be conveyed as a layer having a predetermined thickness on the conveyor 5 to the immersing unit 3. During this time, the rice is heated by steam at about 100° C. supplied from the steam discharge tubes 7 into the steam chambers 6 and rising through the steam passage holes in the conveyor.

The rice supplied to the water tank 8 is fed by the material push-on plates 11 toward the secondary steaming unit 4 while absorbing hot water at about 85° C.

The rice discharge from the water tank 8 is given a predetermined seasoning with the seasoning liquid sprayed from the supply ports 46 of the supply tubes 44 and 45 as it is stirred by the stirrers 15 and 16 while it is conveyed on the conveyor 12. Since the supply tubes 44 and 45 are provided in the space 43, which is free from intrusion of steam from the steam chamber 13, the seasoning liquid at this time is never heated, that is, it will not attach the supply tubes 44 and 45 near the ports 46. Thus, it is possible to supply the seasoning liquid stably and uniformly.

The rice having been seasoned is supplied with vegetables, meat, fish and other ingredient, followed by stirring by the stirrers 17 and 18. Thus, the ingredient are uniformly mixed with the rice. Since the ingredient feeder 47, like the seasoning liquid supply tubes, is free from heating by steam from the steam chambers 13, it is possible to avoid drying of the ingredients.

The rice conveyed forwards by the conveyor 12 is exposed to steam at about 110° C. to 130° C. supplied from the steam chambers 13 to be steamed to obtain seasoned steamed rice, which is then discharged to vessels directly or to a separate belt conveyor.

What is claimed is:

1. An apparatus for continuously cooking rice by steaming comprising:
   a tank for storing rice after being immersed in water;
   a first conveyor for conveying rice supplied from said tank;
   a primary steaming unit for exposing rice being conveyed on said first conveyor to steam;
   a water tank for immersing rice discharged from said first conveyor to water at a high temperature;
   conveying means for forwardly conveying rice in said water tank;
   a second conveyor for conveying rice discharged from said water tank;
   a seasoning liquid feeder provided above an inlet end of said second conveyor for suppling a seasoning liquid such as salt, shoyu, sake, vinegar, edible oil to rice being conveyed;
   an ingredient feeder provided above an inlet end of said second conveyor for supplying vegetables, meat, fish and other ingredients to rice being conveyed; and
   a secondary steaming unit disposed behind said seasoning liquid feeder and ingredient feeder for exposing rice being conveyed on said second conveyor to steam.

2. The apparatus according to claim 1, wherein a space free from intrusion of steam from said secondary steaming unit is formed above an inlet end of said second conveyor, said seasoning liquid feeder being disposed in said space.

3. The apparatus according to claim 2, wherein said ingredient feeder is provided ahead of said space.

4. The apparatus according to claim 1, wherein a stirrer for stirring rice on said second conveyor is provided at a position behind said seasoning liquid feeder.

5. The apparatus according to claim 1, wherein stirrers for stirring rice on said second conveyor are provided behind said seasoning liquid feeder and ingredient feeder, respectively.

* * * * *